United States Patent
Rollender

(10) Patent No.: US 7,480,374 B2
(45) Date of Patent: Jan. 20, 2009

(54) EMERGENCY SERVICE CALL BACK TO A PORTED NUMBER

(75) Inventor: Douglas H. Rollender, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1066 days.

(21) Appl. No.: 10/345,168

(22) Filed: Jan. 16, 2003

(65) Prior Publication Data

US 2004/0141607 A1    Jul. 22, 2004

(51) Int. Cl.
*H04M 3/42* (2006.01)
*H04M 11/04* (2006.01)

(52) U.S. Cl. .............. 379/210.01; 379/37; 379/45; 379/46; 455/404.1

(58) Field of Classification Search ............ 379/207.02, 379/37, 45, 210.01, 46; 455/404.1, 404.2
See application file for complete search history.

(56) References Cited

U.S. PATENT DOCUMENTS

| 5,689,548 A * | 11/1997 | Maupin et al. ............ 455/404.1 |
| 6,252,943 B1 * | 6/2001 | Johnson et al. ................ 379/45 |
| 6,574,323 B1 * | 6/2003 | Manuel et al. ......... 379/207.02 |
| 6,587,545 B1 * | 7/2003 | Antonucci et al. ............. 379/37 |
| 6,721,396 B2 * | 4/2004 | Chin et al. ..................... 379/45 |
| 6,771,742 B2 * | 8/2004 | McCalmont et al. .......... 379/45 |
| 6,868,265 B2 * | 3/2005 | Zodnik ..................... 455/404.1 |
| 7,302,250 B2 | 11/2007 | Chin et al. ................... 455/410 |
| 2003/0108175 A1 * | 6/2003 | Poikselka et al. ....... 379/210.01 |
| 2004/0203565 A1 | 10/2004 | Chin et al. ............... 455/404.1 |
| 2004/0203573 A1 | 10/2004 | Chin et al. ............... 455/404.1 |
| 2004/0203574 A1 | 10/2004 | Chin et al. ............... 455/404.1 |
| 2007/0004379 A1 * | 1/2007 | Stanners .................. 455/404.2 |

OTHER PUBLICATIONS

"NENA Technical Information Document (TID) On PSAP Call Back to All 9-1-1 Callers, Combating Wireles E911 Fraud And Mobile Emergency Service (E911M)", prepared by National Emergency Number Association (NENA), Mobile Emergency Service (E911M) Joint Working Group of the Wireless Technical Committee and the Network Technical Committee, Published by NENA, Mar. 22, 2005, pp. 1-51.

* cited by examiner

*Primary Examiner*—Thjuan K Addy

(57) ABSTRACT

An emergency routing number (ELRN) is assigned to each switch in a wired communication network. When a switch of the wired communication network routes an emergency call to a Public Service Answering Point (PSAP), the switch sends the ELRN as the calling party number and provides the PSAP with a hardware identifier (HID). The HID identifies, at the switch, the landline connecting the switch to the wired phone initiating the emergency call. If the emergency call drops, the PSAP performs a call back using the ELRN as the called party number. The switch that routed the emergency call to the PSAP receives the call back. The PSAP also sends the HID to the switch. When a switch receives its ELRN as the called party number, the switch recognizes an emergency call back situation and routes the emergency call back on the landline identified by the HID.

23 Claims, 2 Drawing Sheets

EMERGENCY SERVICE CALL BACK TO A PORTED NUMBER

BACKGROUND OF THE INVENTION

Emergency service calls in North America are originated by dialing "9-1-1." Other parts of the world may use some other abbreviated string of dialable digits such as "6-1-1" in Mexico; all share the intent to provide the caller with an easy way to call for help with an easy to remember number. These calls are routed to a local Public Service Answering Point (PSAP) where an emergency response may be initiated (police, fire department, road repair, ambulance, etc.) while the caller is kept on the phone. If the call is somehow disconnected or dropped before the emergency is completely reported or the responder arrives, the PSAP may call back the originator using a call back number provided through its databases.

For example, the call record for a 911 call originated through a wired communication network may include Automatic Line Identification (ANI) or the telephone number of the access line from which the call originated. With the introduction of local number portability (LNP) to the public telephone network, a subscriber may switch their telephone service from a landline service provider (LSP) to a wireless service provider (WSP) and port their directory number (DN) (e.g., a phone number) from the LSP to the WSP. During that transitional time period between when a number is ported to and activated by a WSP and deactivated by a LSP (hours to days), emergency service calls may still be originated from the old wired phone as well as the new mobile phone. However, according to current standards, the same DN will be presented to the PSAP as the callback number for both phones.

Since the DN presented to the PSAP as a callback number has been ported to a WSP, a callback from the PSAP will likely be routed through the WSP to a mobile station (MS). This will happen even if the initial emergency call originated at the wired phone. Namely, there is no unique callback number to the wired phone during this transitional time period.

SUMMARY OF THE INVENTION

The call back method according to the present invention assigns a unique emergency local routing number (ELRN) to a switch in a wired communication network. According to one embodiment of the present invention, when a switch of the wired communication network routes an emergency call to a Public Service Answering Point (PSAP), the switch sends the emergency local routing number as the calling party number (CgPN) and provides the PSAP with the hardware identifier (HID) of the landline line connected to the wired phone initiating the emergency call. If the emergency call drops, the PSAP performs a call back using the emergency routing number as the called party number (CdPN). As a result the switch that routed the emergency call from the wired phone to the PSAP receives the call back. The PSAP also sends the HID to the switch. The switch uses the HID to route the emergency call back on the appropriate landline such that the correct wired phone receives the emergency call back.

In another embodiment of the present invention, the switch of the wired communication network stores the directory number (DN) of the wired phone initiating the emergency call in a mapping table in association with the HID. The DN is then signaled to the PSAP along with the ELRN as the CgPN by the switch. When an emergency call back is performed, the PSAP uses the ELRN as the CdPN and supplies the DN in association with the emergency call back. The switch receives the emergency call back and recognizes, on the basis of the ELRN being the CdPN, that the call is an emergency call back. The switch then accesses a HID from the mapping table using the DN supplied with the emergency call back. The switch uses the HID to route the emergency call back on the appropriate landline such that the correct wired phone receives the emergency call back.

Because the switch of a wired communication network according to the present invention completes the routing of an emergency call using the HID, an emergency call back can be completed to a wired phone initiating the emergency call even if the DN of the wired phone has been ported to a wireless communication network.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EMBODIMENTS

Figure 1:
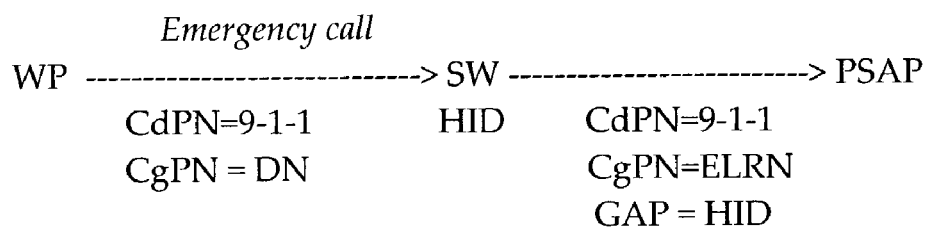
FIGS. 1-3 are communication flow diagrams illustrating the operation of the call back method according to a first embodiment of the present invention.

The call back method according to the present invention assigns a unique routable call back number to each switch (e.g., a 5ESS switch by Lucent Technologies) in a landline communication system. This number will be referred to as an "Emergency Local Routing Number" or ELRN hereafter. The ELRN can be thought of as similar to the local routing number (LRN) assigned to each local switch to implement local number portability (LNP). However, an ELRN can only be routed to the switch that owns the number, and the ELRN for each switch is unique and is not portable.

When a switch of the landline service provider (LSP) receives an emergency call from a wired or wireline phone (e.g., a wired phone from which the directory number has been ported to a wireless service provider), the switch sends the ELRN of the switch to the Public Service Answering point (PSAP) as the calling party number (CgPN). The directory number (DN) of the calling phone that has been ported to a WSP is not signaled from the switch to the PSAP. Instead, the switch identifies the hardware identifier (HID) at the switch associated with the landline connecting the switch to the wired phone initiating the emergency call. The HIDs are unique identifiers at the switch for the landlines connecting wired phones to the switch. As is well-known the HIDs are stored in a mapping table in association with respective DNs. The switch supplies the identified HID to the PSAP in association with the emergency call. In one exemplary embodiment, the HID is signaled in the global address parameter (GAP) of the ISUP message to the PSAP.

If the emergency call drops or should the PSAP need to call back the originator of the emergency call, the PSAP performs the call back using the ELRN as the called party number (CdPN). As a result, the switch that routed the emergency call from the landline phone to the PSAP receives the call back. The PSAP also sends the HID of the landline to the switch.

For example, the HID is signaled with the call back such as in the ISUP generic address parameter.

When the switch receives a call with its ELRN as the CdPN, the switch recognizes an emergency call back situation. The switch then uses the HID received with the call back to identify the landline LL over which to route the call back and complete the call back to the proper wired phone WP. This ELRN technique may also be provisioned with priority queuing in the switches; wherein the switch handles the call back number at a higher priority than tasks involving other calls. This should improve the emergency call back completion rate even during peak traffic periods at the switch.

In a second embodiment of the present invention, a switch receiving an emergency call from a wired or landline phone stores or will have stored the directory number (DN) of the landline phone in a mapping table in association with the HID corresponding to the landline connected to the landline phone. The switch sends the ELRN of the switch to the PSAP as the calling party number (CgPN). The switch also supplies the DN of the wired phone to the PSAP. For example, the DN may be signaled in the ISUP GAP.

If the emergency call drops or should the PSAP need to call back the originator of the emergency call, the PSAP performs the call back using the ELRN as the called party number (CdPN). As a result, the switch that routed the emergency call from the landline phone to the PSAP receives the call back. The PSAP also sends the DN of the landline phone to the switch. For example, the DN is signaled with the call back such as in the ISUP generic address parameter.

When the switch receives a call with its ELRN as the CdPN, the switch recognizes an emergency call back situation. The switch uses the DN received in association with the emergency call back to access the associated HID from the mapping table. The switch then performs an emergency call back using the HID. Namely, the switch uses the HID received with the call back to identify the landline LL over which to route the call back and complete the call back to the proper wired phone WP. This ELRN technique may also be provisioned with priority queuing in the switches; wherein the switch handles the call back number at a higher priority than tasks involving other calls. This should improve the emergency call back completion rate even during peak traffic periods at the switch.

As a further alternative to the embodiments of the present invention, when a switch of a wired communication network receives the call with an ELRN as the (CdPN), the switch performs a fraud check methodology to ensure that the emergency call back is from a PSAP and not someone attempting to perpetrate theft of service. One exemplary embodiment of the fraud check methodology will now be described. Each switch maintains a list of valid PSAP calling party numbers. When the switch receives the emergency call back, the switch determines whether the calling party number is on the list. If so, the switch continues with processing the emergency call back as described above with respect to the embodiments of the present invention. If not, the switch ignores the emergency call back.

Other fraud prevention embodiments include: the switch may handle only calls to an ELRN that arrived on a specific trunk group from the PSAP, or some secure access code used to validate the emergency call back may be inserted in the ISUP subaddress by the PSAP making the call back.

Figure 2:
Figure 3:
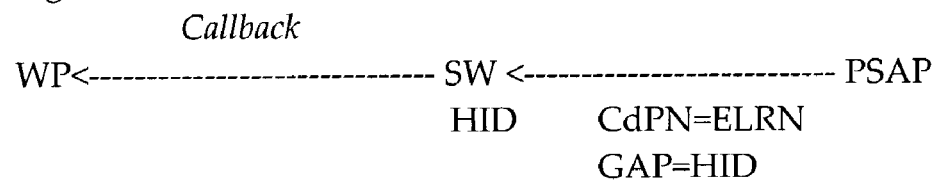

FIGS. 1-3 are communication flow diagrams illustrating the operation of the call back method according to the first embodiment of the present invention. As shown in FIG. 1, a wired phone WP places an emergency call, a 9-1-1 call in this example, that is received by a switch SW of a landline or wired communication network. Accordingly, the called party number is 9-1-1, and the calling party number (CgPN) is the directory number (DN) of the wired phone WP, which may have been ported to a wireless service provider. The switch SW then identifies the HID of the landline connected to the wired phone WP. The switch SW then routes the emergency call to the serving PSAP. In so doing, the CgPN remains 9-1-1, but the switch SW supplies its ELRN as the calling party number. The switch SW also supplies the HID of the landline connected to the wired phone WP in the generic address parameter (GAP).

If the emergency call is dropped, the PSAP performs a call back using the ELRN as the called party number because the ELRN was supplied to the PSAP as the calling party number. The result is that the call back is routed to the switch SW as shown in FIG. 2. As further shown in FIG. 2, the HID is signaled with the call back in the ISUP GAP. As shown in FIG. 3, the switch SW uses the HID received with the call back to identify the landline over which to route the call back and complete the call back to the proper wired phone WP.

Figure 4:
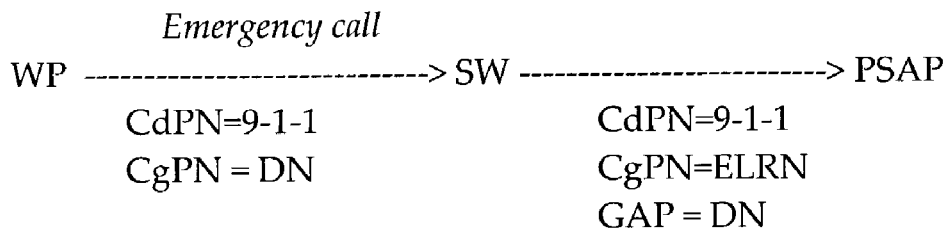
FIGS. 4-6 are communication flow diagrams illustrating the operation of the call back method according to a first embodiment of the present invention.
Figure 5:
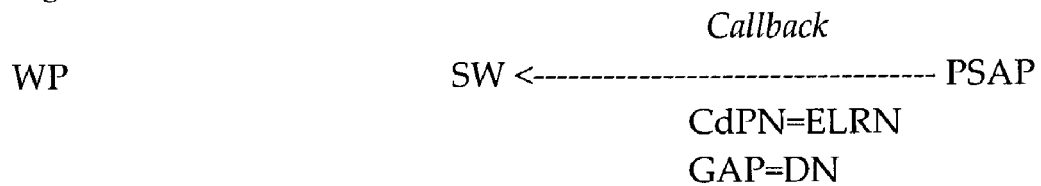
Figure 6:
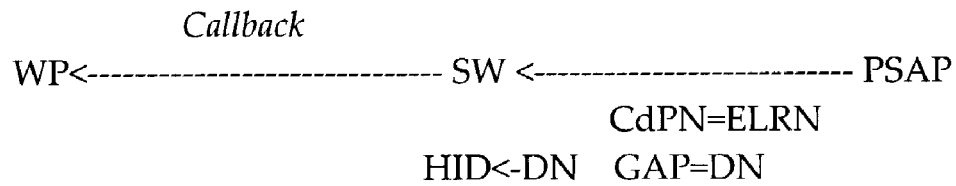

FIGS. 4-6 are communication flow diagrams illustrating the operation of the call back method according to the second embodiment of the present invention. As shown in FIG. 4, a wired phone WP places an emergency call, a 9-1-1 call in this example, that is received by a switch SW of a landline or wired communication network. Accordingly, the called party number is 9-1-1, and the calling party number (CgPN) is the directory number (DN) of the wired phone WP, which may have been ported to a wireless service provider. The switch SW then routes the emergency call to the serving PSAP. In so doing, the CgPN remains 9-1-1, but the switch SW supplies its ELRN as the calling party number. The switch SW also supplies the DN of the wired phone WP in the generic address parameter (GAP).

If the emergency call is dropped, the PSAP performs a call back using the ELRN as the called party number because the ELRN was supplied to the PSAP as the calling party number. The result is that the call back is routed to the switch SW as shown in FIG. 5. As further shown in FIG. 5, the DN is signaled with the call back in the ISUP GAP. As shown in FIG. 6, the switch SW uses the DN to access the associated HID from a mapping table. The switch SW then routes the call back over the accessed HID and completes the call back to the proper wired phone WP.

The emergency call back method of the present invention ensures a routable call back number is provided to a PSAP with every emergency call from a wired phone—even wired phones that have had their DNs ported to a wireless service provider. Specifically, the ELRN is one number used to route one or many emergency service call backs to the originating switch.

In the North American Numbering Plan, the ELRN is a 10-digit number (NPA-NXX-XXXX) where the leading 6-digits (NPA-NXX) are uniquely assigned to each local switch in North America for call routing purposes. The subsequent four digits are assigned by the switch operator. However, the emergency call back method is applicable in a public switched network anywhere in the world. Namely, the ELRN contains those digits assigned from any national numbering plan to route calls to a particular switch.

The emergency call back method is independent of number portability and number pooling. These network capabilities depend upon the Local Routing Number (LRN) Method to route a call to a serving switch based on the LRN associated with a ported or pooled dialed number. In comparison, the ELRN is not associated with a dialed number, instead it is associated with a switch.

In some ways, the ELRN functions in the public network like the Local Routing Number (LRN) required for local number portability; for instance, both function as a single number to route many calls to a particular switch. However, no database query is required to identify the ELRN required to route a call to a switch. As such, when the ELRN is used as the CgPN to route a call from the PSAP to a local switch, the ISUP message contains an indicator that a LNP database query is not to be performed.

The invention being thus described, it will be obvious that the same may be varied in many ways. Such variations are not to be regarded as a departure from the spirit and scope of the invention, and all such modifications are intended to be included within the scope of the following claims.

I claim:

1. A method for assigning an emergency routing number, comprising:
   assigning an emergency routing number to a switch in a wired communication network for use as the calling party number of emergency calls routed to a Public Service Answering Point (PSAP) by the switch, the emergency routing number being such that a call routed to the switch including the emergency routing number as a called party number is recognized by the switch as an emergency call back based on the emergency routing number without retrieving an identifier of a mobile station; and
   identifying a hardware identifier at the switch, the hardware identifier identifying the landline connecting the switch to the wired phone initiating an emergency call.

2. The method of claim 1, wherein the assigned emergency routing number is not portable.

3. A method for supplying information associated with an emergency call, comprising:
   sending an emergency routing number and a hardware identifier to a Public Service Answering Point (PSAP), the emergency routing number being the emergency routing number of a switch in a wired communication network handling communication needs of a wired phone initiating an emergency call and being such that a call routed to the switch including the emergency routing number as a called party number is recognized by the switch as an emergency call back based on the emergency routing number without retrieving an identifier of a mobile station, and the hardware identifier identifying, at the switch, the landline connecting the switch to the wired phone initiating the emergency call.

4. An emergency call back method, comprising:
   receiving, at a Public Service Answering Point (PSAP), an emergency routing number of a switch in a wired communication network handling communication needs of a wired phone initiating an emergency call, the emergency routing number being such that a call routed to the switch including the emergency routing number as a called party number is recognized by the switch as an emergency call back based on the emergency routing number without retrieving an identifier of a mobile station;
   receiving a hardware identifier in association with the emergency routing number, the hardware identifier identifying, at the switch, the landline connecting the switch to the wired phone initiating the emergency call; and
   initiating a call back to the wired phone at the PSAP by calling the emergency routing number when the emergency call made by the wired phone drops.

5. The method of claim 4, further comprising:
   signaling the hardware identifier to the switch when initiating the call back.

6. The method of claim 5, wherein the signaling step sends the hardware identifier in a generic address parameter.

7. A method for routing a call, comprising:
   receiving, at a switch of a wired communication network, a called party number and a hardware identifier associated with a call; and
   routing the call on a landline associated with the hardware identifier when the called party number matches an emergency routing number assigned to the switch, the hardware identifier identifying, at the switch, the landline connecting the switch to the wired phone initiating an emergency call, the emergency routing number being such that a call routed to the switch including the emergency routing number as the called party number is recognized by the switch as an emergency call back based on the emergency routing number without retrieving an identifier of a mobile station.

8. The method of claim 7, wherein the receiving step receives the hardware identifier in a generic address parameter.

9. The method of claim 7, wherein the routing step is performed with priority over other tasks at the switch.

10. The method of claim 7, further comprising:
    performing a process to validate the call; and wherein
    the routing step routes the call when the call is validated.

11. The method of claim 10, wherein the perform step comprises:
    comparing a calling party number of the call to a list of valid calling party numbers; and
    validating the call when the comparing step indicates that the calling party number of the call is on the list.

12. The method of claim 11, wherein the list is a list of Public Service Answering Point calling party numbers.

13. The method of claim 7, wherein the call is an emergency call back from a PSAP.

14. A method for handling an emergency call, comprising:
    receiving a directory number of a wired phone in association with an emergency call from the wired phone;
    storing, at a switch of a wired communication network, a hardware identifier in a mapping table in association with the directory number, the hardware identifier identifying at the switch the landline connecting the switch to the wired phone initiating the emergency call; and
    sending an emergency routing number and the directory number to a Public Service Answering Point (PSAP), the emergency routing number being the emergency routing number of the switch in handling communication needs of a wired phone initiating an emergency call and being such that a call routed to the switch including the emergency routing number as a called party number is recognized by the switch as an emergency call back based on the emergency routing number without retrieving an identifier of a mobile station.

15. The method of claim 14, wherein the sending step sends the emergency routing number as the calling party number.

16. The method of claim 14, wherein the sending step signals the directory number of the wired phone to the PSAP in a generic address parameter.

17. A method for routing a call, comprising:
    receiving, at a switch of a wired communication network, a called party number and a directory number associated with a call;
    accessing a hardware identifier from a mapping table using the directory number when the called party number matches an emergency routing number assigned to the switch, the hardware identifier identifying, at the switch, the landline connecting the switch to the wired phone initiating the emergency call; and routing the call on the landline associated with the hardware identifier when the called party number matches an emergency routing number assigned to the switch, the emergency routing number being such that a call routed to the switch including the emergency routing number as the called party number is recognized by the switch as an emergency call back based on the emergency routing number without retrieving an identifier of a mobile station.

18. The method of claim 17, wherein the receiving step receives the directory number in a generic address parameter.

19. The method of claim 17, wherein the routing step is performed with priority over other tasks at the switch.

20. The method of claim 17, further comprising:
performing a process to validate the call; and wherein
the routing step routes the call when the call is validated.

21. The method of claim 20, wherein the performing step comprises:
comparing a calling party number of the call to a list of valid calling party numbers; and
validating the call when the comparing step indicates that the calling party number of the call is on the list.

22. The method of claim 21, wherein the list is a list of Public Service Answering Point calling party numbers.

23. The method of claim 17, wherein the call is an emergency call back from a PSAP.

* * * * *